(12) United States Patent
Terajima (10) Patent No.: US 11,488,756 B2
(45) Date of Patent: Nov. 1, 2022

(54) OPTICAL MEMBER SUPPORTING DEVICE, OPTICAL MEMBER DRIVING DEVICE, CAMERA DEVICE AND ELECTRONIC APPARATUS

(71) Applicant: New Shicoh Motor Co., Ltd., Zhejiang (CN)

(72) Inventor: Kokichi Terajima, Yamato (JP)

(73) Assignee: NEW SHICOH MOTOR CO., LTD, Zhejiang (CN)

( * ) Notice: Subject to any disclaimer, the term of this patent is extended or adjusted under 35 U.S.C. 154(b) by 273 days.

(21) Appl. No.: 16/810,981

(22) Filed: Mar. 6, 2020

(65) Prior Publication Data
US 2020/0286658 A1 Sep. 10, 2020

(30) Foreign Application Priority Data

Mar. 7, 2019 (CN) .......................... 201910172996.7

(51) Int. Cl.
| | | |
|---|---|---|
| H01F 7/08 | (2006.01) | |
| H01F 7/126 | (2006.01) | |
| H01F 27/28 | (2006.01) | |
| H04N 5/225 | (2006.01) | |
| H04N 5/232 | (2006.01) | |

(52) U.S. Cl.
CPC ............ *H01F 7/081* (2013.01); *H01F 7/126* (2013.01); *H01F 27/28* (2013.01); *H04N 5/2254* (2013.01); *H04N 5/2328* (2013.01)

(58) Field of Classification Search
CPC .......... H01F 7/081; H01F 7/126; H01F 27/28; H04N 5/2254; H04N 5/2328
See application file for complete search history.

(56) References Cited

U.S. PATENT DOCUMENTS

| | | | | |
|---|---|---|---|---|
| 10,928,702 | B2* | 2/2021 | Kim | G02B 27/646 |
| 11,209,663 | B2* | 12/2021 | Park | G03B 5/00 |
| 2014/0362284 | A1* | 12/2014 | Shin | H04N 5/2254 348/373 |
| 2016/0019844 | A1 | 1/2016 | Yang et al. | |
| 2016/0139426 | A1* | 5/2016 | Park | G02B 27/646 359/557 |
| 2019/0391410 | A1* | 12/2019 | Park | G02B 7/08 |

FOREIGN PATENT DOCUMENTS

KR 20160021158 2/2016

* cited by examiner

*Primary Examiner* — Bernard Rojas
(74) *Attorney, Agent, or Firm* — Hayes Soloway PC (57) ABSTRACT

An optical member supporting device is described that includes, in an XYZ rectangular coordinate system, spherical bodies, a first holding portion and a second holding portion, an optical member held by the first holding portion or the second holding portion, first yokes protruding from the first holding portion facing the second holding portion, and second yokes protruding from the second holding portion facing the first holding portion and opposed to the first yokes in a predetermined direction in the X-Y direction. The first holding portion and second holding portion extend in an X-Y direction and are opposed in a Z direction with the spherical body interposed therebetween. The second holding portion includes a second magnet and the first yokes and the second yokes are opposed to the second magnet in the Z direction.

9 Claims, 11 Drawing Sheets

Fig.11 sure, there is provided an optical member driving device including the optical member supporting device described above and a coil, the coil is connected to the first holding portion and is opposed to the second magnet.

In accordance with a third aspect of the present disclosure, there is provided a camera device including the above-mentioned optical member supporting device.

In accordance with a fourth aspect of the present disclosure, there is provided an electronic apparatus including the camera device described above.

DESCRIPTION OF DRAWINGS

FIG. 11 is a perspective view showing the second magnet 208, the second rolling plate 207, the first yokes 11a, 11b,

OPTICAL MEMBER SUPPORTING DEVICE, OPTICAL MEMBER DRIVING DEVICE, CAMERA DEVICE AND ELECTRONIC APPARATUS

CROSS-REFERENCE TO RELATED APPLICATION

This application claims the benefit of Chinese patent application CN201910172996.7 filed on Mar. 7, 2019, the contents of which are incorporated by reference herein.

TECHNICAL FIELD

The present disclosure relates to an optical member supporting device used in electronic apparatus such as smartphone and the like, an optical member driving device, a camera device, and an electronic apparatus.

BACKGROUND

The camera devices mounted on electronic apparatus such as smartphones and the like include those having optical hand shake correction function. There is a patent document of Korea patent laid-open No. 10-2016-0021158 (hereinafter referred to as "Patent Document 1" disclosing a technique related to this type of camera device. The camera module of PATENT DOCUMENT 1 has a configuration including: a first hand shake correction part, wherein a first frame, a second frame, and a third frame with a lens-barrel are accommodated in a nested structure, and the second frame and the third frame are moved within the first frame along a first direction perpendicular to the optical axis; and a second hand shake correction part, wherein the third frame is moved within the first frame along a second direction perpendicular to the optical axis and the first direction.

However, in the case of the technology in PATENT DOCUMENT 1, a three-layer structure has to be used. In this three-layer structure, straight-advancing mechanism toward the first direction, guide intermediary body, and straight-advancing mechanism toward the second direction are laminated in the Z direction, and each of the layers is connected by a guiding structure using spherical bodies. Thus, a problem that the bulkiness in the Z direction becomes larger is resulted.

The present disclosure has been made in view of such problem, and an object thereof is to provide an optical member supporting device, an optical member driving device, a camera device, and an electronic apparatus that enables movement in the XY plane and rotation around the Z axis with small friction and that can be mounted on a thin electronic device such as a smartphone.

SUMMARY

In accordance with a first aspect of the present disclosure, there is provided an optical member supporting device that includes, in an XYZ rectangular coordinate system: spherical bodies; a first holding portion and a second holding portion for holding an optical member on one of the first holding portion and the second holding portion, each extending in an X-Y direction and opposed in a Z direction with the spherical body interposed therebetween; first yokes protruding from regions of the first holding portion facing the second holding portion toward the second holding portion side; second yokes protruding from regions of the second holding portion facing the first holding portion toward the first holding portion side and opposed to the first yokes in a predetermined direction in the X-Y direction; the second holding portion includes a second magnet, and the first yokes and the second yokes are opposed to the second magnet in the Z direction.

In accordance with a second aspect of the present disclo-

12*a*, 12*b*, 13*a*, 13*b*, 14*a*, 14*b*, the second yokes 21*a*, 21*b*, 22*a*, 22*b*, 23*a*, 23*b*, 24*a*, 24*b*, and the spherical bodies 31, 32, 33, 34 of the optical member driving device 9 according to the second embodiment of the present disclosure.

DETAILED DESCRIPTION

Hereinafter, embodiments of the present disclosure are explained with reference to drawings.

First Embodiment

Figure 1:
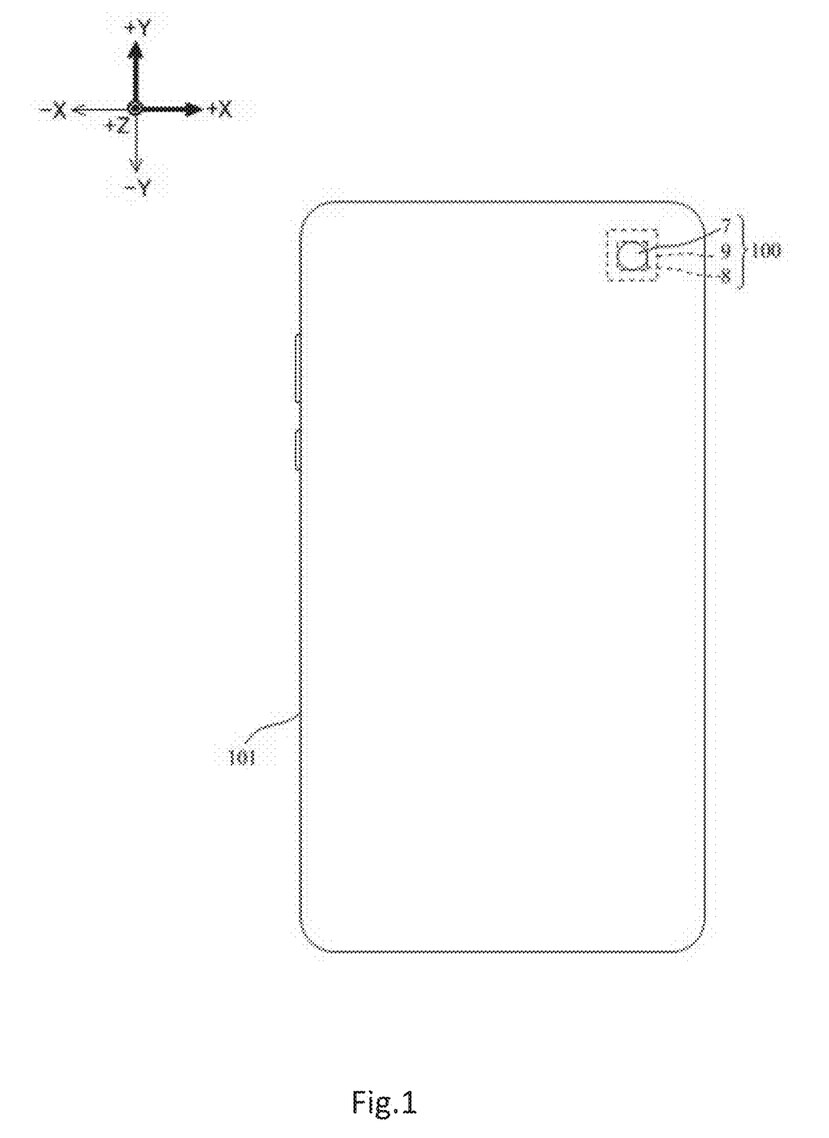
FIG. 1 is a front view of a smartphone 101 mounted with a camera device 100 including an optical member driving device 9 according to a first embodiment of the present disclosure.

As shown in FIG. 1, the camera device 100 including the optical member driving device 9 according to the first embodiment of the present disclosure is embedded in the case body so that the lens body 7 is exposed from an opening in the rear surface of the case body of the smartphone 101.

The camera device 100 includes: a lens body 7; an image sensor 8 converting light incident through the lens body 7 into an image signal; and an optical member driving device 9 holding the lens body 7 and the image sensor 8 and driving the image sensor 8 with respect to the lens body 7. In this disclosure, an XYZ rectangular coordinate system is used, and one direction parallel to the optical axis direction of the lens body 7 is referred to as a +Z direction, the opposite direction is referred to as a −Z direction, and the +Z direction and the −Z direction are collectively referred to as a ±Z direction. Further, one direction orthogonal to the ±Z direction is referred to as +X direction, the opposite direction is referred to as −X direction, and the +X direction and −X direction are collectively referred to as a ±X direction. Further, one direction orthogonal to the ±Z direction and the ±X direction is referred to as +Y direction, the opposite direction is referred to as −Y direction, and the +Y direction and the −Y direction are collectively referred to as a ±Y direction. Further, the ±X direction and the ±Y direction are collectively referred to as an XY direction. Further, the side of the subject viewed from the lens body 7 may be referred to as the front side, and the opposite side (the image sensor 8 side) may be referred to as the rear side.

Figure 2:
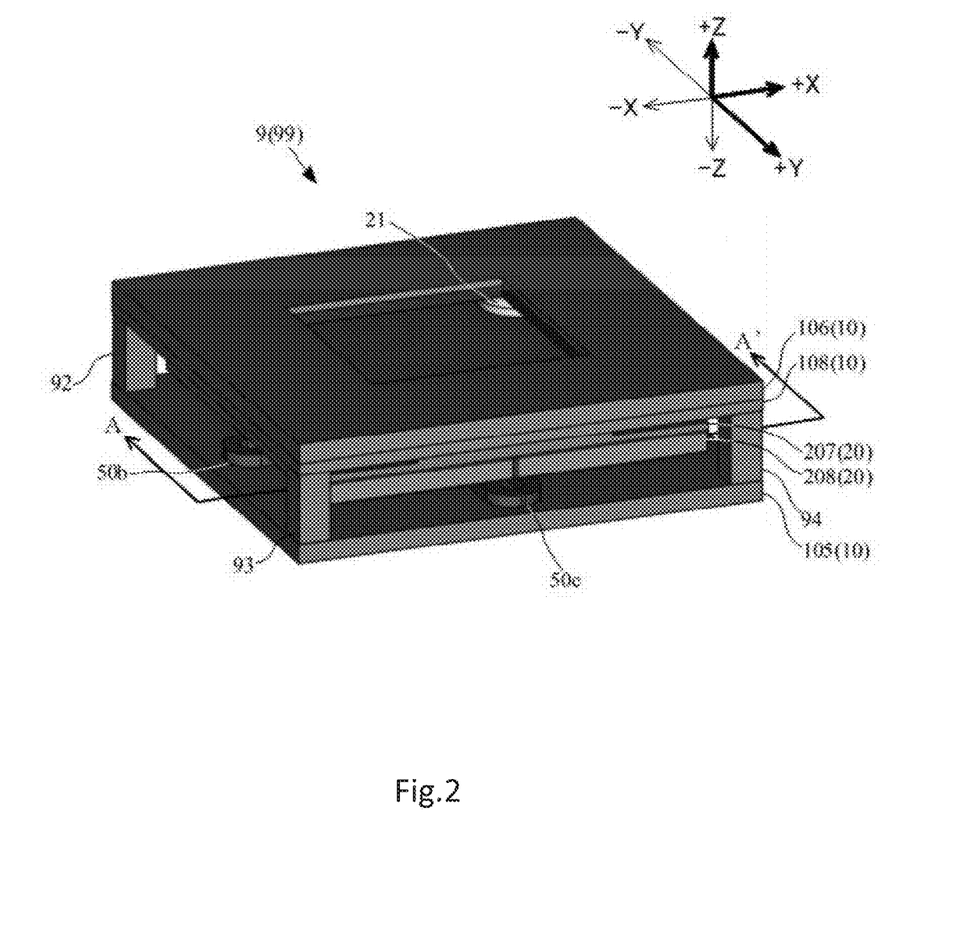
FIG. 2 is a perspective view of the optical member driving device 9 in FIG. 1.
Figure 3:
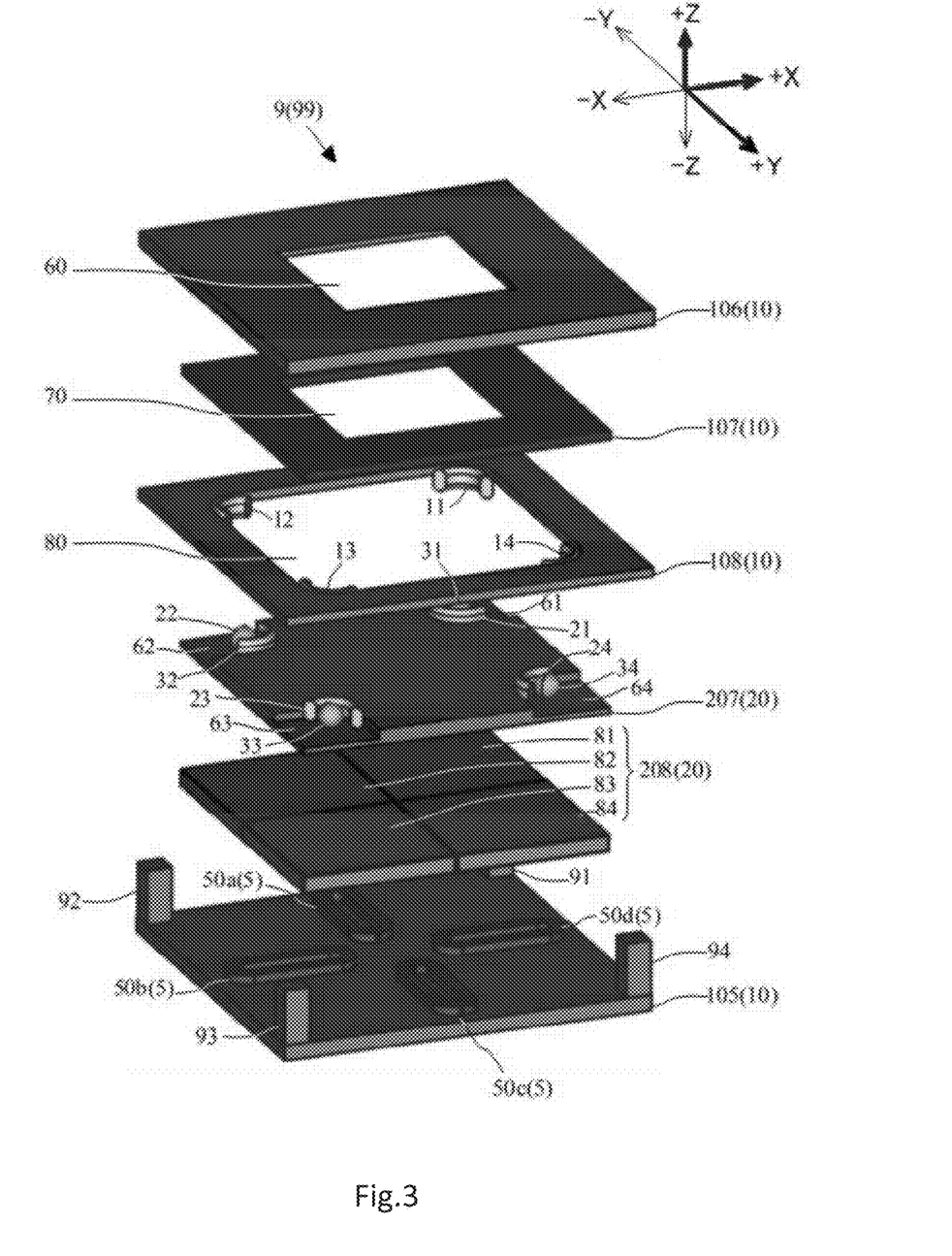
FIG. 3 is an exploded perspective view of a cover 106, a first rolling plate 107, a cover 108, a second rolling plate 207, a second magnet 208, and a base 105 of the optical member driving device 9 in FIG. 1.

As shown in FIG. 2 and FIG. 3, the optical member driving device 9 includes an optical member supporting device 99 relatively movably supporting the lens body 7 and the image sensor 8, and a driving mechanism driving the image sensor 8 with respect to the lens body 7. The lens body 7 moves in the ±Z direction by an AF (Autofocus) actuator (not shown).

The optical member supporting device 99 includes a first holding portion 10 and a second holding portion 20 each extending in the XY direction and four spherical bodies 31, 32, 33, and 34 interposed therebetween. In the description of the following embodiment, the first holding portion 10 is described as a fixed side that is fixed to the main body side of the camera device 100 and the second holding portion 20 is described as a mobile side that is relatively movable with respect to the fixed side. However, the first holding portion 10 and the second holding portion 20 are relative to each other with respect to the positional relation therebetween, and thus the fixed side and the mobile side may be reversed. The first holding portion 10 is formed by joining a base 105 and a laminate of a cover 106, a first rolling plate 107, and a cover 108 via column portions 91, 92, 93, and 94 at four corners. The second holding portion 20 is formed by joining a second rolling plate 207 and a second magnet 208. The above-mentioned AF actuator for driving the lens body 7 in the ±Z direction is mounted on the front side of a through hole 60 of the cover 106 in the first holding portion 10. The image sensor 8 is fixed to the center of the front surface of the second rolling plate 207 in the second holding portion 20.

Using FIG. 3, the configuration of the first holding portion 10 and the second holding portion 20 will be explained in detail. The base 105 of the first holding portion 10 is a plate body having square front and rear surfaces. For example, this base 105 is fixed to the main body of the camera device 100. Two pairs of opposite edges of the base 105 respectively extend in the XY direction. Four corners on the front surface of the base 105 are fixed with column portions 91, 92, 93, and 94.

The cover 106 and the cover 108 are square annular plate bodies formed of non-magnetic materials (for example, materials such as nonmagnetic plywood, ceramic, resin). The first rolling plate 107 is a square annular plate body formed of a ferromagnetic body. The sizes of the cover 106 and the cover 108 are the same as the size of the base 105. The size of the first rolling plate 107 is smaller than the sizes of the cover 106 and the cover 108 and is fitted into the recess portion (not shown) formed in the rear side surface of the cover 106.

A through hole 60 is penetrated in the center of the cover 106. A through hole 70 is penetrated in the center of the first rolling plate 107. A through hole 80 is penetrated in the center of the cover 108. The through hole 60 of the cover 106 and the through hole 70 of the first rolling plate 107 are formed in a square shape of the same size. The through hole 80 of the cover 108 has a shape in which the corner portions of the four corners of the square shape are rounded into a quarter arc-shape. The size of the through hole 80 of the cover 108 is larger than the sizes of the through hole 60 of the cover 106 and the through hole 70 of the first rolling plate 107.

First yokes 11, 12, 13, and 14 are provided in four corners of the through hole 80 of the cover 108, respectively. The first yokes 11, 12, 13, and 14 are ferromagnetic bodies. The first yokes 11, 12, 13, and 14 are formed in a semi-circular shape. The thickness of the first yokes 11, 12, 13, and 14 in the Z direction is thicker than the thickness of the cover 108. The first yokes 11, 12, 13, and 14 are jointed to the rear side surface of the first rolling plate 107 inside the four corners of the through hole 80 of the cover 108 with the flat end surfaces toward the center of the cover 108.

The cover 106, the first rolling plate 107, and the cover 108 are stacked and adhered so that the directions of the edges of the through holes 60, 70, and 80 and the center of these through holes are aligned. In a state that the cover 106, the first rolling plate 107, and the cover 108 are adhered, a part of the first yokes 11, 12, 13, and 14 in the thickness direction projects to the rear side of the rear surface of the cover 108. Further, the cover 108 is fixed to the column portions 91, 92, 93, and 94.

The second rolling plate 207 of the second holding portion 20 is a plate body formed by non-magnetic material. Inside the corner portions of the four corners of the second rolling plate 207, there are recess portions 61, 62, 63, and 64 recessed from the front surface side to the rear surface side of the second rolling plate 207. The recess portions 61, 62, 63, and 64 of the second rolling plate 207 have a quarter arc-shape on the center side.

There are second yokes 21, 22, 23, and 24 at each of the positions where the quarter arc-shape is formed in the recess portions 61, 62, 63, and 64 of the second rolling plate 207. The second yokes 21, 22, 23, and 24 are ferromagnetic bodies having the same size and shape as the first yokes 11, 12, 13, and 14. The second yokes 21, 22, 23, and 24 are jointed to the bottoms of the recess portions 61, 62, 63, and 64 with the flat end surfaces facing the corner portions (opposite center) of the second rolling plate 207. A part of the second yokes 21, 22, 23, and 24 in the thickness direction projects to the front side of the front surface of the second rolling plate 207.

The second magnet 208 is a plate body in which four magnet pieces 81, 82, 83, and 84 are bonded together so as to have the same size as the first rolling plate 107. The magnet piece 81 is adjacent to the magnet piece 82 in the ±X direction, and the magnet piece 83 is adjacent to the magnet piece 84 in the ±X direction. The magnet piece 81 is adjacent to the magnet piece 84 in the ±Y direction, and the magnet piece 82 is adjacent to the magnet piece 83 in the ±Y direction. The four magnet pieces 81, 82, 83, and 84 are magnetized so that the adjacent magnet pieces have different polarities in the ±Z direction. For example, the magnet pieces 81 and 83 are magnetized with the N pole on the +Z side and the S pole on the −Z side, and the magnet pieces 82 and 84 are magnetized with the S pole on the +Z side and the N pole on the −Z side.

The second rolling plate 207 and the second magnet 208 in the second holding portion 20 are stacked and adhered. The second holding portion 20 is accommodated in the space between the first rolling plate 107 and the base 105 of the first holding portion 10 so as not to contact the column portions 91, 92, 93, and 94. The second holding portion 20 is drawn to the first rolling plate 107 by a magnetic force between the second magnet 208 and the first rolling plate 107.

The first rolling plate 107 of the first holding portion 10 and the second rolling plate 207 of the second holding portion 20 are opposed to each other in the ±Z direction with the first yokes 11, 12, 13, 14, the second yokes 21, 22, 23, 24, and the spherical bodies 31, 32, 33, 34 interposed therebetween. The spherical bodies 31, 32, 33, and 34 are steel spheres made from ferromagnetic bodies in the present first embodiment. The first yokes 11, 12, 13, and 14 of the first holding portion 10 protrude toward the second rolling plate 207 side from regions of the cover 108 facing the second rolling plate 207 of the second holding portion 20. The second yokes 21, 22, 23, and 24 of the second holding portion 20 protrude toward the cover 108 side from regions of the second rolling plate 207 facing the cover 108.

Figure 4:
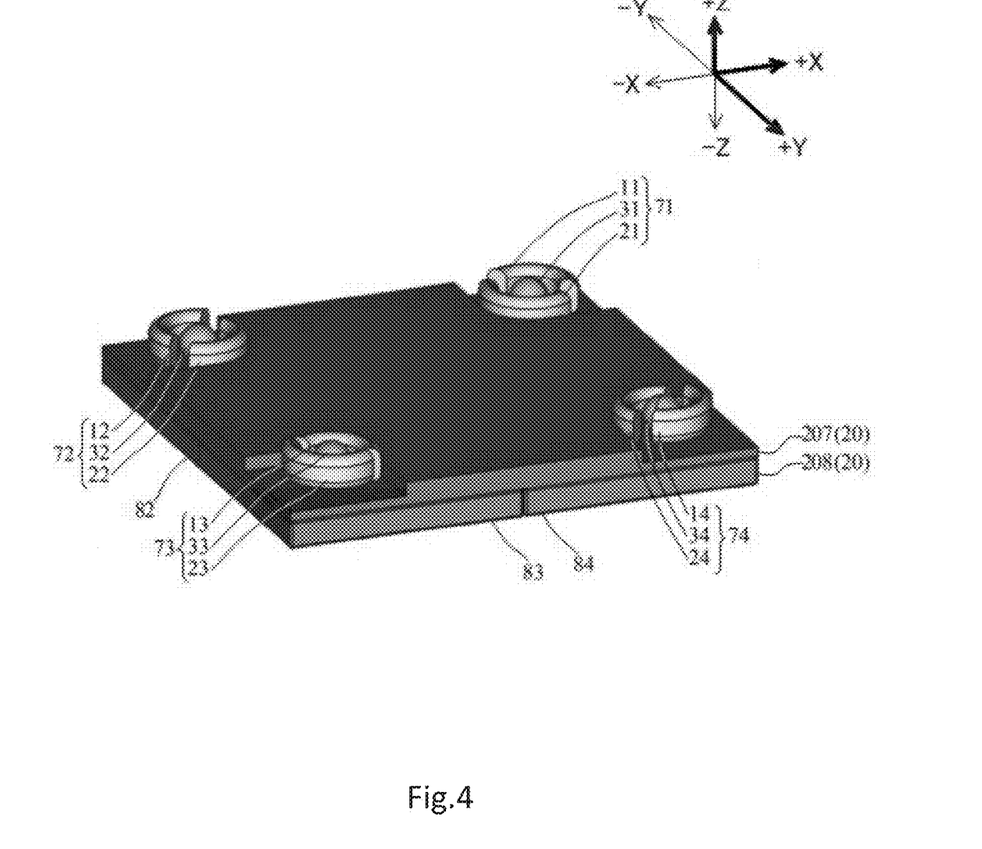
FIG. 4 is a perspective view of a second magnet 208, a second rolling plate 207, first yokes 11, 12, 13, 14, second yokes 21, 22, 23, 24, and spherical bodies 31, 32, 33, 34 of the optical member driving device 9 in FIG. 1.

As shown in FIG. 4, between the region of the cover 108 facing the second rolling plate 207 and the region of the second rolling plate 207 facing the cover 108, a supporting unit 71 including the first yoke 11, the second yoke 21, and the spherical body 31, a supporting unit 72 including the first yoke 12, the second yoke 22, and the spherical body 32, a supporting unit 73 including the first yoke 13, the second yoke 23, and the spherical body 33, and a supporting unit 74 including the first yoke 14, the second yoke 24, and the spherical body 34 are provided.

Each pair of the first yoke and the second yoke in the four sets of the supporting units 71, 72, 73, 74 are adjacent and opposed to each other at their end surfaces at the positions of the four corners surrounded by the through hole 80 of the cover 108 and the recess portions 61, 62, 63, 64 of the second rolling plate 207. Specifically, the pair of the first yoke 11 and the second yoke 21 in the supporting unit 71 are arranged so as to form an annular shape as a whole with a slight gap between the end surfaces of each other. The spherical body 31 is disposed at the center of a perfectly circular space surrounded by the inner circumferential surface of the first yokes 11 and the inner circumferential surface of the second yokes 21. There is a gap between the spherical body 31 and the inner circumferential surfaces of the first yokes 11 and the second yokes 21. The position relationship among the first yoke 12, the second yoke 22, and the spherical body 32 of the supporting unit 72, the position relationship among the first yoke 13, the second yoke 23, and spherical body 33 of the supporting unit 73, and the position relationship among the first yoke 14, the second yoke 24, and spherical body 34 of the supporting unit 74 are the same as that in the supporting unit 71.

Figure 5:
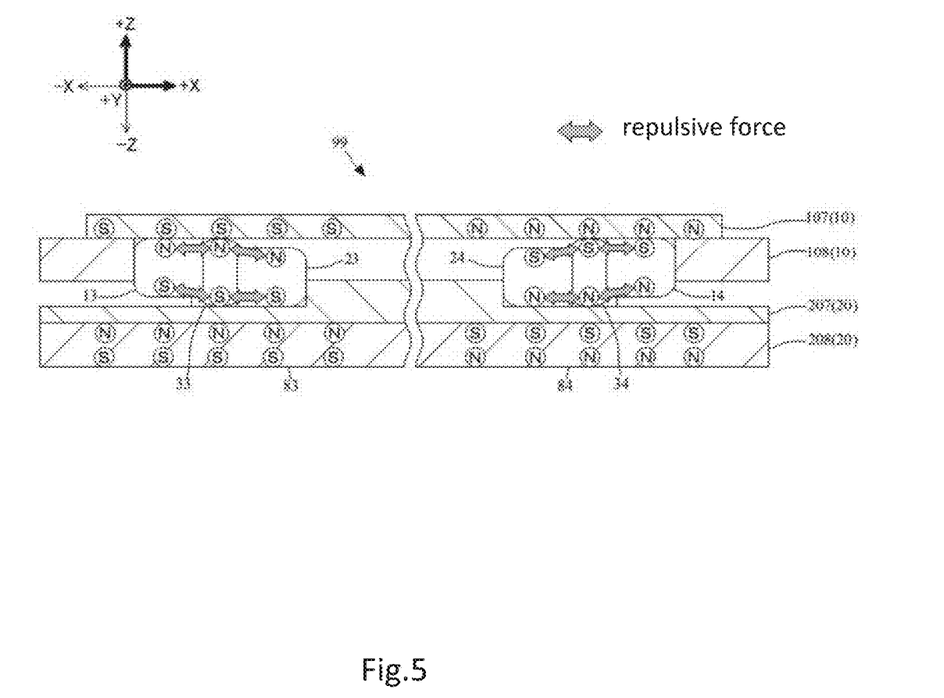
FIG. 5 is a diagram in which marks indicating magnetic poles and arrow marks indicating repulsive forces are marked on a cross-section taken along line A-A' of magnet pieces 83, 84 of the second magnet 208, the second rolling plate 207, the cover 108, and the first rolling plate 107 of the optical member driving device 9 in FIG. 2.

As shown in FIG. 5, the spherical bodies 31, 32, 33, and 34 abut against the first rolling plate 107 and the second rolling plate 207 at front points and rear points where the spherical bodies 31, 32, 33, and 34 intersect the diameter lines parallel to the ±Z direction on the outer peripheral surfaces of the spherical bodies 31, 32, 33, and 34. Therefore, the first holding portion 10 and the second holding portion 20 relatively move in the XY direction while rolling the spherical bodies 31, 32, 33, and 34. The rolling distances of the spherical bodies 31, 32, 33, and 34 due to the relative movement of the first holding portion 10 and the second holding portion 20 are half the distance of the relative movement of the first holding portion 10 and the second holding portion 20.

The diameters of the spherical bodies 31, 32, 33, and 34 are larger than the protrusion amounts of the first yokes 11, 12, 13, 14 from the first rolling plate 107 and the protrusion amounts of the second yokes 21, 22, 23, 24 from the bottom surfaces of the recess portions of the second rolling plate 207, and is smaller than twice the protrusion amounts of the first yokes 11, 12, 13, 14 and the protrusion amounts of the second yokes 21, 22, 23, 24. Therefore, the first yokes 11, 12, 13, and 14 protrude toward the side of the second rolling plate 207 of the second holding portion 20 beyond the centers of the spherical bodies 31, 32, 33, and 34, but do not reach the second rolling plate 207, and gaps are formed between the rear ends of the first yokes 11, 12, 13, and 14 and the second rolling plate 207.

Further, the second yokes 21, 22, 23, and 24 protrude toward the side of the first rolling plate 107 of the first holding portion 10 beyond the centers of the spherical bodies 31, 32, 33, and 34, but do not reach the first rolling plate 107, and gaps are formed between the front ends of the second yokes 21, 22, 23, and 24 and the first rolling plate 107. Therefore, the first holding portion 10 and the second holding portion 20 can move relatively smoothly. Further, even if the first holding portion 10 and the second holding portion 20 move relatively and the spherical bodies 31, 32, 33, and 34 come into contact with the first yokes 11, 12, 13, and 14 or the second yokes 21, 22, 23, and 24, it is difficult to ride on them.

The first rolling plate 107 and the second magnet 208 are opposed to each other in the ±Z direction with the supporting units 71, 72, 73, 74 interposed therebetween. When viewed from the ±Z direction, the supporting unit 71 is located on the front side of the magnet piece 81 of the second magnet 208, the supporting unit 72 is located on the front side of the magnet piece 82, and the supporting unit 74 is fitted on the front side of the magnet piece 84. Further, the supporting units 71, 72, 73, and 74 are all located on the rear side of the first rolling plate 107.

As shown in FIG. 5, due to the actions of the first rolling plate 107 and the magnet pieces 81, 83, the sides of the first yokes 11, 13, the second yokes 21, 23, and the spherical bodies 31, 33 facing the first rolling plate 107 are magnetized to N poles, and the sides facing the magnet pieces 81, 83 are magnetized to S poles. Further, due to the actions of the first rolling plate 107 and the magnet pieces 82, 84, the sides of the first yokes 12, 14, the second yokes 22, 24, and the spherical bodies 32, 34 facing the first rolling plate 107 are magnetized to S poles, and the sides facing the magnet pieces 82, 84 are magnetized to N poles. Thus, repulsive forces are generated among the three of the first yoke 11, the second yoke 21, and the spherical body 31, among the three of the first yoke 12, the second yoke 22, and the spherical body 32, among the three of the first yoke 13, the second yoke 23, and the spherical body 33, and among the three of the first yoke 14, the second yoke 24, and the spherical body 34.

Figure 6:
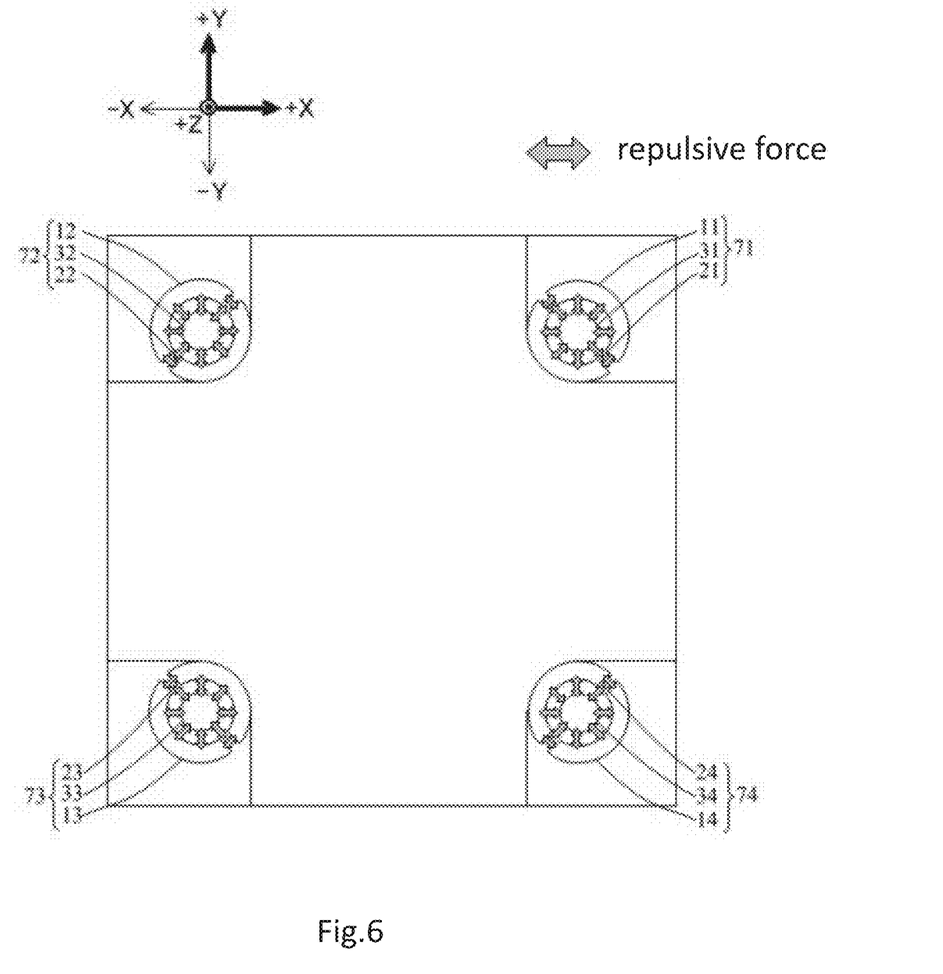
FIG. 6 is a diagram showing repulsive forces among the three of the first yokes 11, 12, 13, 14, the second yokes 21, 22, 23, 24, and the spherical bodies 31, 32, 33, 34 of the optical member driving device 9 in FIG. 1.

The magnitude and direction of the repulsive force depends on the distance among the first yoke, the second yoke, and the spherical body. The repulsive force among those with a near distance is larger than the repulsive force among those with a far distance. As shown in FIG. 6, when viewed from the ±Z direction, at a position where the center of the first holding portion 10 and the center of the second holding portion 20 are completely overlapped (this position is referred to as an initial position), the first yoke 11 and the second yoke 21, the first yoke 12 and the second yoke 22, the first yoke 13 and the second yoke 23, and the first yoke 14 and the second yoke 24 are respectively opposed to each other at their end surfaces and are formed in an annular shape. The distances between the spherical bodies 31, 32, 33, 34 and the each point on the inner circumferential surfaces of the first yokes 11, 12, 13, 14 and the second yokes 21, 22, 23, 24 in the radial directions of the spherical bodies 31, 32, 33, 34 are the same.

As a result, at the initial position, the repulsive force between the spherical body 31 and each point on the inner circumferential surfaces of the first yoke 11 and the second yoke 21, the repulsive force between the spherical body 32 and each point on the inner circumferential surfaces of the first yoke 12 and the second yoke 22, the repulsive force between the spherical body 33 and each point on the inner circumferential surfaces of the first yoke 13 and the second yoke 23, and the repulsive force between the spherical body 34 and each point on the inner circumferential surfaces of the first yoke 14 and the second yoke 24 are balanced. Further, the repulsive force generated at the end surface of the first yoke 11 and the end surface of the second yoke 21 and the repulsive force generated at the end surface of the first yoke 13 and the end surface of the second yoke 23 are balanced, and the repulsive force generated at the end surface of the first yoke 12 and the end surface of the second yoke 22, and the repulsive force generated at the end surface of the first yoke 14 and the end surface of the second yoke 24 are balanced.

Here, when the first holding portion 10 and the second holding portion 20 relatively move away from the initial position, an imbalance occurs in the repulsive forces among the three parties of the first yokes 11, 12, 13, 14, the second yokes 21, 22, 23, 24, and the spherical bodies 31, 32, 33, 34, and a restoring force is generated to return the first holding portion 10 and the second holding portion 20 to the initial position.

Figure 7:
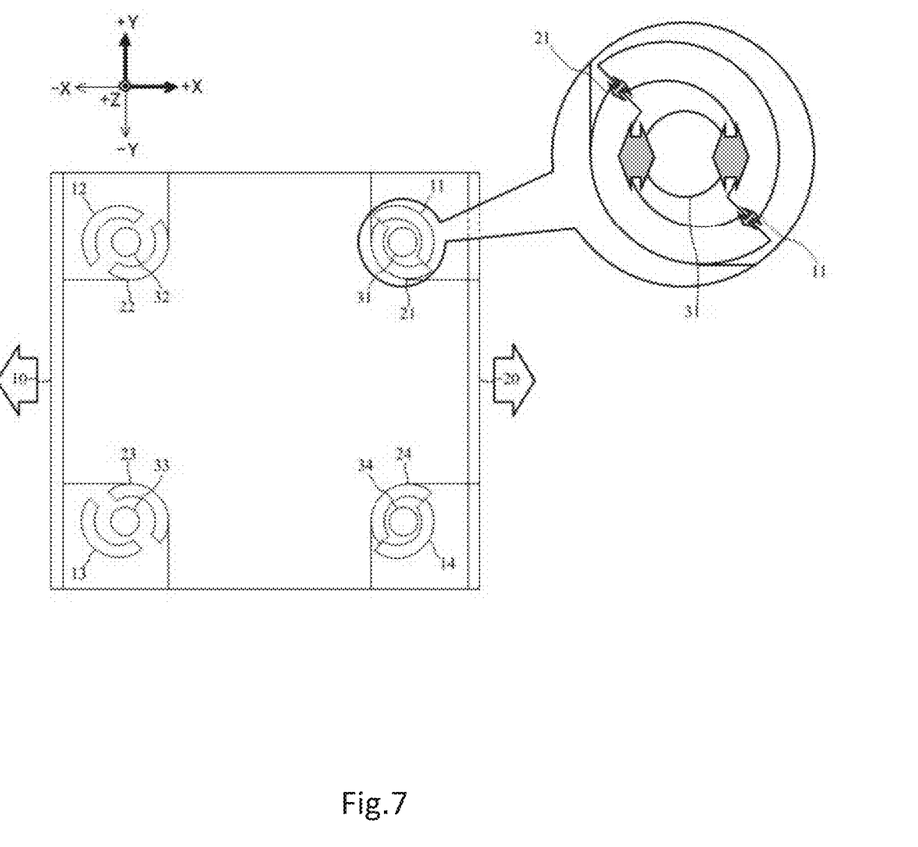
FIG. 7 is a diagram showing a state of a change in the repulsive forces among three parties of the first yokes 11, 12, 13, 14, the second yokes 21, 22, 23, 24, and the spherical bodies 31, 32, 33, 34 accompanying the relative movement of the first holding portion 10 and the second holding portion 20 of the optical member driving device 9 in FIG. 1.

For example, as shown in FIG. 7, when the first holding portion 10 moves in the −X direction and the second holding portion 20 moves in the +X direction relatively, the distance in the ±X direction of each of the pair of the first yoke 12 and the second yoke 22 and the pair of the first yoke 13 and the second yoke 23 on the side of the −X direction increases, and the distance in the ±X direction of each of the pair of the first yoke 11 and the second yoke 21 and the pair of the first yoke 14 and the second yoke 24 on the side of the +X direction decreases. As shown in the enlarged frame of FIG. 7, when the distance in the ±X direction of each of the pair of the first yoke 11 and the second yoke 21 and the pair of the first yoke 14 and the second yoke 24 decreases, the repulsive force in the ±X direction among the three of the first yoke 11, the second yoke 21, and the spherical body 31 and the repulsive force in the ±X direction among the three of the first yoke 14, the second yoke 24, and the spherical body 34 become larger. The repulsive force becomes a restoring force for returning the first holding portion 10 and the second holding portion 20 to the initial position. Further, since the repulsive force is generated, when any of the first yoke 14, the second yoke 24, and the spherical body 34 would be about to collide with each other during movement, it is possible to weak the mechanical shock due to the collision.

Figure 8:
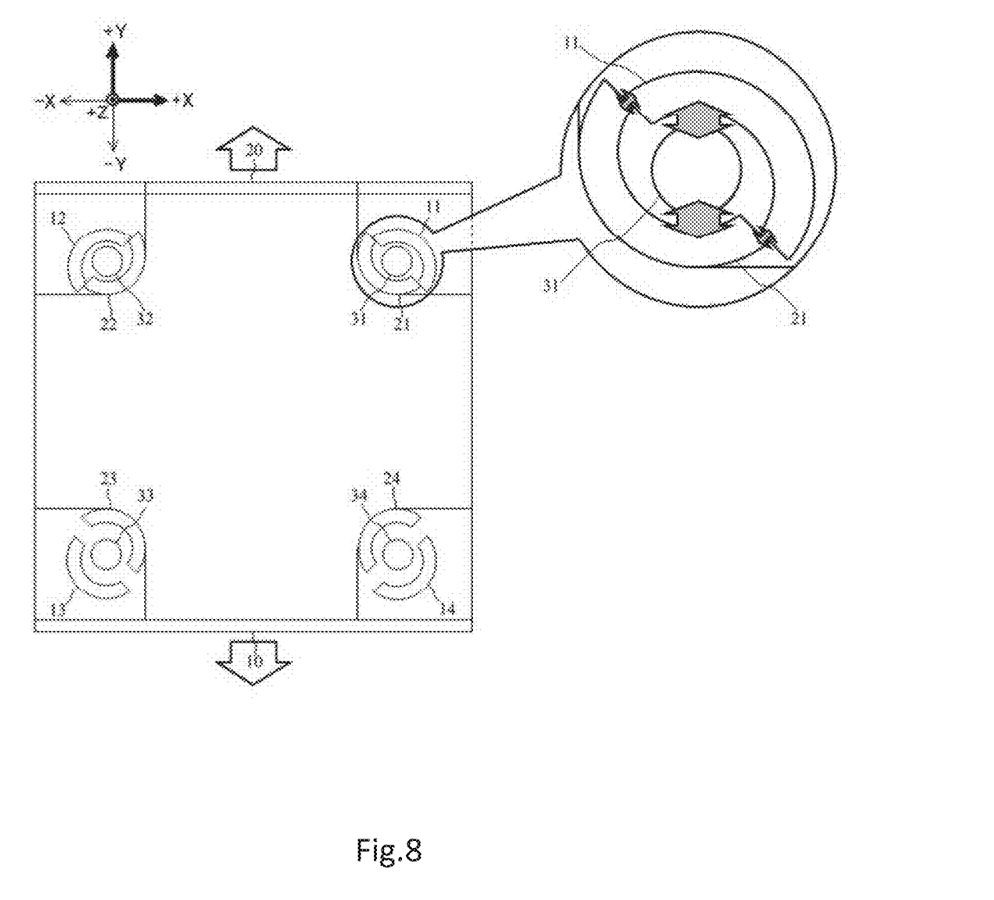
FIG. 8 is a diagram showing a state of a change in the repulsive forces among three parties of the first yokes 11, 12, 13, 14, the second yokes 21, 22, 23, 24, and the spherical bodies 31, 32, 33, 34 accompanying the relative movement of the first holding portion 10 and the second holding portion 20 of the optical member driving device 9 in FIG. 1.

For example, as shown in FIG. 8, when the first holding portion 10 moves in the −Y direction and the second holding portion 20 moves in the +Y direction relatively, the distance in the ±Y direction of each of the pair of the first yoke 13 and the second yoke 23 and the pair of the first yoke 14 and the second yoke 24 on the side of the −Y direction increases, and the distance in the ±Y direction of each of the pair of the first yoke 11 and the second yoke 21 and the pair of the first yoke 12 and the second yoke 22 on the side of the +Y direction decreases. As shown in the enlarged frame of FIG. 8, when the distance in the ±Y direction of each of the pair of the first yoke 11 and the second yoke 21 and the pair of the first yoke 12 and the second yoke 22 decreases, the repulsive force in the ±Y direction among the three of the first yoke 11, the second yoke 21, and the spherical body 31 and the repulsive force in the ±Y direction among the three of the first yoke 12, the second yoke 22, and the spherical body 32 become larger. The repulsive force becomes a restoring force for returning the first holding portion 10 and the second holding portion 20 to the initial position.

Figure 9:
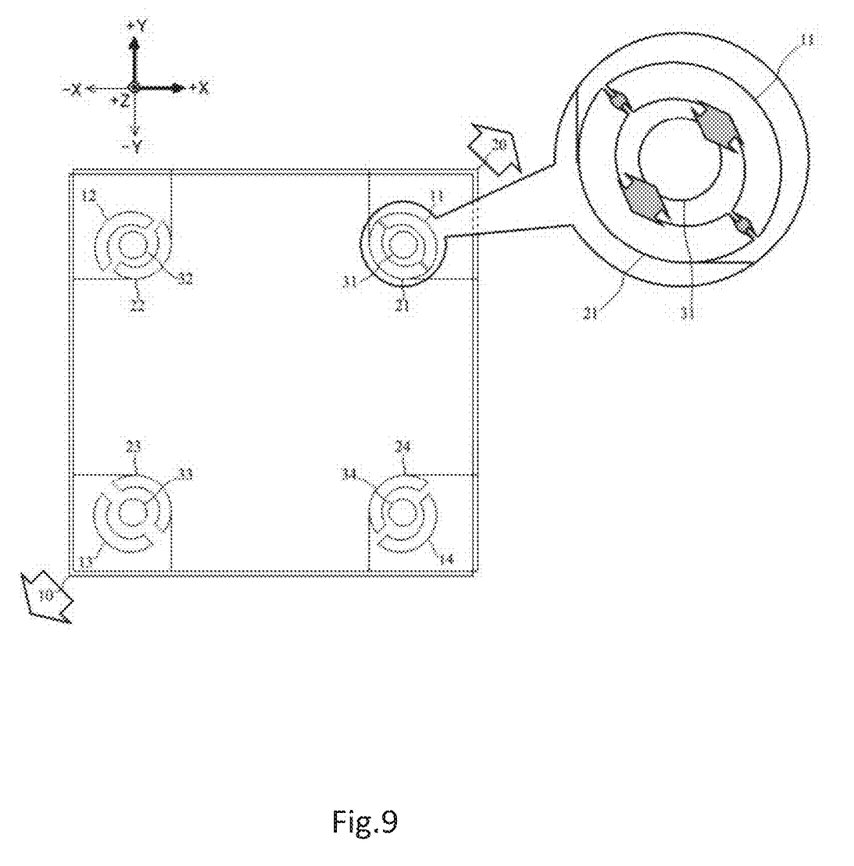
FIG. 9 is a diagram showing a state of a change in the repulsive forces among three parties of the first yokes 11, 12, 13, 14, the second yokes 21, 22, 23, 24, and the spherical bodies 31, 32, 33, 34 accompanying the relative movement of the first holding portion 10 and the second holding portion 20 of the optical member driving device 9 in FIG. 1.

As shown in FIG. 9, when relatively the first holding portion 10 moves in one direction on the diagonal line passing through the spherical bodies 31 and 33 (a direction from the spherical body 31 toward the spherical body 33), and the second holding portion 20 moves in the other direction on the diagonal line (a direction from the spherical body 33 toward the spherical body 31), the distance between the pair of the first yoke 13 and the second yoke 23 on the side in the one direction on the diagonal line increases, and the distance between the pair of the first yoke 11 and the second yoke 21 on the side in the other direction on the diagonal line decreases. As shown in the enlarged frame of FIG. 9, when the distance of the pair of the first yoke 11 and the second yoke 21 decreases, the repulsive force among the three of the first yoke 11, the second yoke 21, and the spherical body 34 becomes larger. This repulsive force becomes a restoring force for returning the first holding portion 10 and the second holding portion 20 to the initial position. Further, in the case of rotation around an axis parallel to the Z direction, for example, in the case of rotation in the counterclockwise direction, the same displacement as that of the first yoke 12, the second yoke 22, and the spherical body 32 in the supporting unit 72 occurs in the supporting units 71, 72, 73, and 74, and this becomes a restoring force for returning to the initial position in the circumferential direction.

Next, the driving mechanism is explained. As shown in FIG. 3, a coil 5 is fixed on the front surface of the base 105. The coil 5 includes four coil pieces 50a, 50b, 50c, and 50d. The four coil pieces 50a, 50b, 50c, and 50d are wound in the same direction (for example, the clockwise direction as viewed from the +Z direction) with the ±Z direction as the winding axis.

The coil pieces 50a and 50c are respectively located at positions separated on both sides in the ±Y direction with the center of the base 105 sandwiched. Each of the coil pieces 50a and 50c has two linear portions extending in the ±Y direction and two semicircular portions connecting two linear portions. The coil pieces 50b and 50d are respectively located at positions separated on both sides in the ±X direction across the center of the base 105. The coils 50b and 50d have two linear portions extending in the ±X direction and two semicircular portions connecting the two linear portions, respectively.

Figure 10:
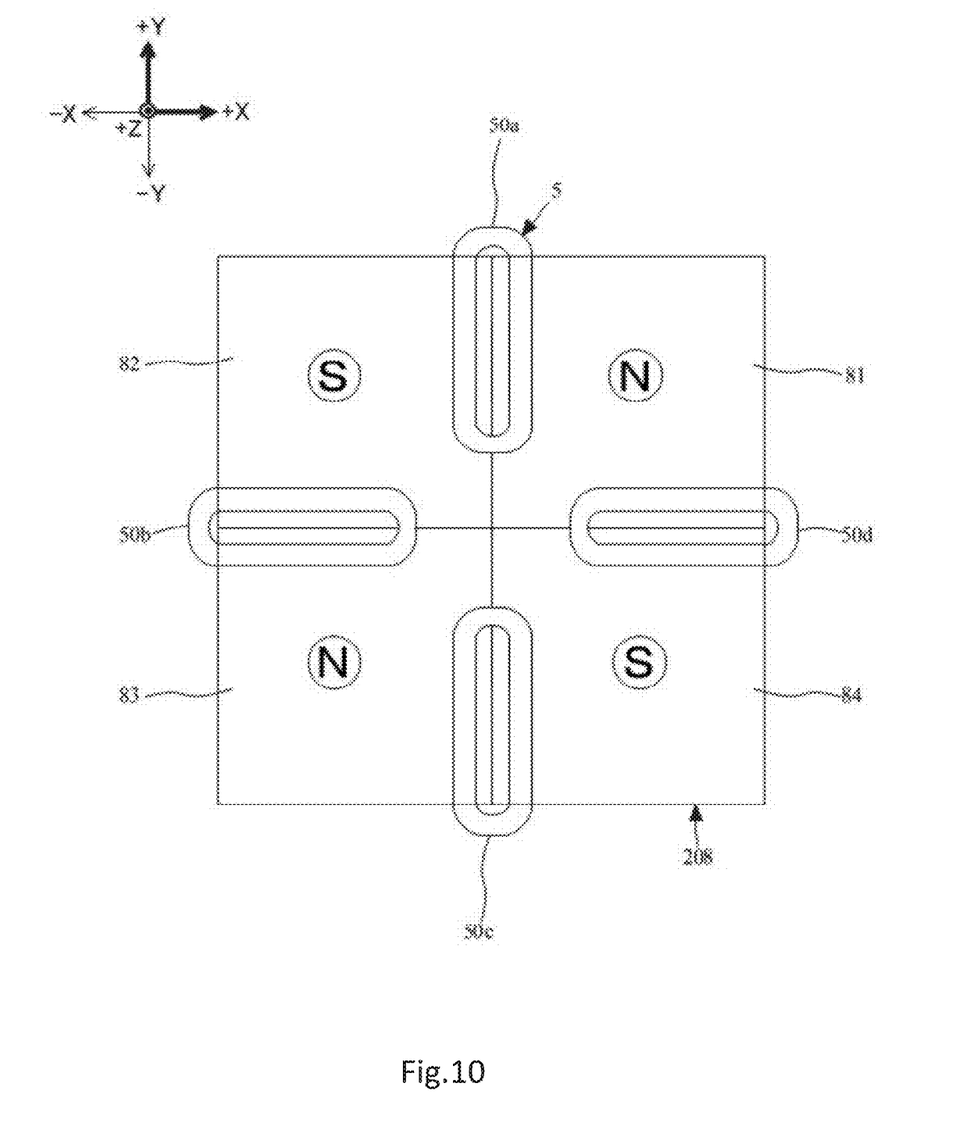
FIG. 10 is a diagram showing the position relationship between magnet pieces 81, 82, 83, 84 and coil pieces 50a, 50b, 50c, 50d of the optical member driving device 9 in FIG. 1.

The second magnet 208 also serves as a magnet for driving. As shown in FIG. 10, the coil piece 50a is positioned so as to stride over the boundary portion between the magnet piece 81 and the magnet piece 82, the coil piece 50b is positioned so as to stride over the boundary portion between the magnet piece 82 and the magnet piece 83, the coil piece 50c is positioned so as to stride over the boundary portion between the magnet piece 83 and the magnet piece 84, and the coil piece 50d is positioned so as to stride over the boundary portion between the magnet piece 84 and the magnet piece 81.

When a predetermined electric current is applied to the four coil pieces 50a, 50b, 50c, and 50d of the coil 5, a Lorentz force in the ±X direction is generated in the coil pieces 50a and 50c, and a Lorentz force in the ±Y direction is generated in the coil pieces 50b and 50d. The reaction of the Lorentz forces causes the second holding portion 20 to move relatively to the first holding portion 10. That is, with respect to the first holding portion 10, the second holding portion 20 relatively moves against the repulsive forces among the three parties of the inner circumferential surfaces and the end surfaces of the first yokes 11, 12, 13, 14, the inner circumferential surfaces and the end surfaces of the second yokes 21, 22, 23, 24, and the spherical bodies 31, 32, 33, and 34 while rolling the spherical bodies 31, 32, 33, and 34.

Specifically, when an electric current is applied to the coil piece 50a in the counterclockwise direction and an electric current is applied to the coil piece 50c in the clockwise direction, a Lorentz force in the +X direction is generated in the coil piece 50a and the coil piece 50c. The second holding portion 20 moves in the −X direction while rolling the spherical bodies 31, 32, 33, and 34 by the reaction of the Lorentz force. If the direction in which the electric current flows is reversed, the second holding portion 20 moves in the +X direction.

When an electric current is applied to the coil piece 50b in the counterclockwise direction and an electric current is applied to the coil piece 50d in the clockwise direction, a Lorentz force in the −Y direction is generated in the coil pieces 50b and the coil pieces 50d. The second holding portion 20 moves in the +Y direction while rolling the spherical bodies 31, 32, 33, and 34 by the reaction of the Lorentz force. If the direction in which the electric current flows is reversed, the second holding portion 20 moves in the −Y direction.

When an electric current is applied in the clockwise direction to all of the coil pieces 50a, 50b, 50c, and 50d, a Lorentz force in the −X direction is generated in the coil piece 50a, a Lorentz force in the +Y direction is generated in the coil piece 50b, a Lorentz force in the +X direction is generated in the coil piece 50c, and a Lorentz force in the −Y direction is generated in the coil piece 50d. The second holding portion 20 rotates in the clockwise direction with an axis parallel to the ±Z direction passing through the center of the second holding portion 20 as the rotation axis while rolling the spherical bodies 31, 32, 33, and 34 by the reaction of the Lorentz forces. If the direction in which the electric current flows is reversed, the second holding portion 20 moves in the counterclockwise direction. Further, the electric current may flow through only one of the coil pieces 50a, 50c or the coil pieces 50b, 50d.

According to the first embodiment, it is possible to guide the image sensor 8 as the optical member while allowing to move in a plane parallel to the XY direction and rotate around an axis parallel to the Z direction with respect to the lens body 7, and it is also possible to realize an optical member supporting device that can be mounted on a thin electronic apparatus such as the smartphone 101. That is, since the size in the height direction of the optical member supporting device 99 is defined by the thickness of the first holding portion 10, the thickness of the second holding portion 20, and the diameters of the spherical bodies 31, 32, 33, and 34, it can be made thin. Further, since the optical member driving device 9 employs this optical member supporting device 99, it can be made thin. Furthermore, since the second magnet 208 also serves as a magnet for driving, the optical member driving device 9 can be made thinner.

If the spherical bodies 31, 32, 33, 34 are ferromagnetic bodies, since a repulsive force acts between each of the first yokes 11, 12, 13, 14 and the second yokes 21, 22, 23, 24, they are less likely to collide and remain stable at the center between the first yokes 11, 12, 13, 14 and the second yokes 21, 22, 23, 24. Therefore, friction caused by contact between the spherical bodies 31, 32, 33, 34 and each of the first yokes 11, 12, 13, 14 and the second yokes 21, 22, 23, 24 is less likely to occur, and the second rolling plate 207 can be moved at a low load.

It should be noted that, in this first embodiment, although the example in which the second magnet is used for both supporting and driving, a separate magnet for driving may be provided without using the magnet for driving.

Further, in the first embodiment, although four pairs of opposing first yokes 11, 12, 13, 14 and second yokes 21, 22, 23, 24 are disposed between the first holding portion 10 and the second holding portion 20, the number of pairs is not necessary to be four. It is sufficient that at least three pairs of first yokes 11, 12, 13, 14 and second yokes 21, 22, 23, 24 are provided, and the first yokes 11, 12, 13, 14 and the second yokes 21, 22, 23, 24 in each pair are opposed to each other.

Further, in the first embodiment, the spherical bodies 31, 32, 33, 34 are ferromagnetic bodies, but the spherical bodies 31, 32, 33, 34 may be formed of a non-magnetic material that is not a ferromagnetic body. Repulsive forces are also generated between the opposing first yokes 11, 12, 13, 14 and second yokes 21, 22, 23, 24 in the supporting units 71, 72, 73, 74. Therefore, even when the spherical bodies 31, 32, 33, 34 are formed of non-magnetic material that is not a ferromagnetic body, the first holding portion 10 and the second holding portion 20 can relatively move against the repulsive forces between the first yokes 11, 12, 13, 14 and the second yokes 21, 22, 23 while rolling the spherical bodies 31, 32, 33, 34. Further, in this case, the spherical bodies 31, 32, 33, 34 are not necessary to be disposed between the first yokes 11, 12, 13, 14 and the second yokes 21, 22, 23, 24, and may be disposed at completely different positions. Further, in this case, the first yokes 11, 12, 13, 14 and the second yokes 21, 22, 23, 24 are not necessary to form an annular shape. For example, flat plate like first yokes 11, 12, 13, 14 and second yokes 21, 22, 23, 24 may be opposed to each other.

Further, in the first embodiment an example is disclosed in which the first yokes 11, 12, 13, 14 and the second yokes 21, 22, 23, 24 are opposed to each other in a diagonal line direction, however, they may also be opposed to each other, for example, in a direction orthogonal to the diagonal line. In this case, it is desirable to arrange in such a manner that the repulsive force acting among the supporting units 71, 72, 73, and 74 is balanced.

Further, the polarities of the four magnet pieces 81, 82, 83, and 84 in the ±Z direction may be reversed from those of the first embodiment, and the magnet pieces 81 and 83 are magnetized with the S pole on the +Z side and the N pole on the −Z, and the magnet pieces 82 and 84 may be magnetized with the N pole on the +Z side and the S pole on the −Z side.

Further, the second magnet 208 may contact the spherical bodies 31, 32, 33, 34. Similarly, the second yokes 21, 22, 23, 24 may be directly fixed to the second magnet 208. In those cases, the second magnet 208 also serves as the second rolling plate 207. The first rolling plate 107 may be formed of a magnet material as the first magnet. Further, the first rolling plate 107 may be formed of a non-magnetic body. In this case, the first magnet or the ferromagnetic body may be opposed to the second magnet 208 via the first rolling plate 107, or the first magnet and the ferromagnetic body may not be provided.

It is not necessary for the driving mechanism to use the electromagnetic force generated by the magnet and the coil as the driving source. For example, a shape memory alloy or a piezoelectric element may be used.

Second Embodiment

Figure 11:
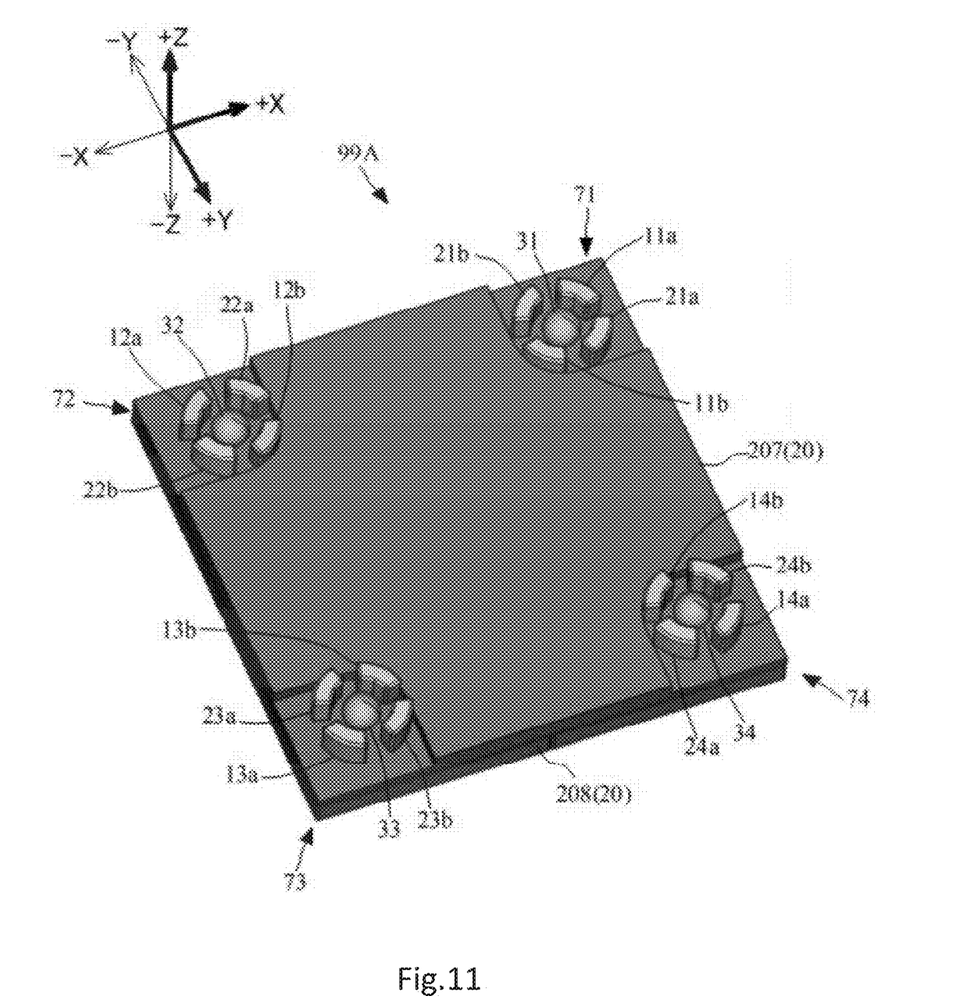

As shown in FIG. 11, in the optical member supporting device 99A according to the second embodiment of the present disclosure, the total number of first yokes and second yokes in the supporting units 71, 72, 73 is four, respectively, and each pair of yokes is divided so that the first yokes and the second yokes are arranged at 90-degree intervals. In the optical member supporting device 99A according the second embodiment, the first yokes 11*a* and 11*b* and the second yokes 21*a* and 22*b* in the supporting unit 71 are opposed to each other at their end surfaces, respectively, and are arranged alternatively to form a ring shape, and a spherical body 31 is provided inside the first yokes 11*a*, 11*b* and the second yokes 21*a*, 22*b*.

The position relationship among the first yokes 12*a*, 12*b*, the second yokes 22*a*, 22*b*, and the spherical body 32 in the supporting unit 72, the position relationship among the first yokes 13*a*, 13*b*, the second yokes 23*a*, 23*b*, and the spherical body 33 in the supporting unit 73, and the position relationship among the first yokes 14*a*, 14*b*, the second yokes 24*a*, 24*b*, and the spherical body 34 in the supporting unit 74 are the same as that in the supporting unit 71.

In a state where the first holding portion 10 and the second holding portion 20 are in the initial position, all of the distances between the end surfaces of the adjacent first yokes and the end surfaces of the second yokes in each of the supporting units 71, 72, 73, 74 are the same, and the repulsive forces between the end surfaces of the first yokes and the end surfaces of the second yokes are balanced as a whole. When the first holding portion 10 and the second holding portion 20 move in the YX direction also including the rotation direction, the distance between one first yoke of the opposing two first yokes and the second yoke in each of the supporting units 71, 72, 73, 74 increases, and the distance between the other first yoke and the second yoke decreases. The repulsive force increases between the end surface of the first yoke and the end surface of the second yoke in which the distance has become narrower. This repulsive force becomes a restoring force for returning the first holding portion 10 and the second holding portion 20 to the initial position. In the first embodiment, the repulsive forces of two supporting units 71, 73 are balanced and the repulsive forces of two supporting units 72, 74 are balanced in respective diagonal line directions of the four supporting units 71, 72, 73, and 74. In this second embodiment, the repulsive force is balanced and the restoring force works in each of the supporting units 71, 72, 73, and 74. Therefore, one supporting unit of the second embodiment is established as a system. In the second embodiment, since a restoring force can be obtained in each of the supporting units 71, 72, 73, and 74, a more stable supporting effect can be obtained than in the first embodiment.

What is claimed is:

1. An optical member supporting device, comprising:
   in an XYZ rectangular coordinate system,
   spherical bodies;
   a first holding portion and a second holding portion for holding an optical member on one of the first holding portion and the second holding portion, each extending in X-Y directions and opposed in a Z direction with the spherical body interposed therebetween;
   first yokes protruding from regions of the first holding portion facing the second holding portion toward the second holding portion side;
   second yokes protruding from regions of the second holding portion facing the first holding portion toward the first holding portion side and opposed to the first yokes in a predetermined direction in the X-Y direction;
   wherein the second holding portion comprises a second magnet, and the first yokes and the second yokes are opposed to the second magnet in the Z direction, and
   wherein the first yokes and the second yokes are opposed to each other at their end surfaces and alternately arranged to form a ring shape, and the spherical bodies are arranged on an inner periphery side of the first yokes and the second yokes.

2. The optical member supporting device according to claim 1, wherein the spherical bodies have a diameter larger than a protrusion amount of the first yokes and the second yokes.

3. The optical member supporting device according to claim 1, wherein the spherical bodies are formed by ferromagnetic bodies.

4. The optical member supporting device according to claim 1, wherein the first yokes protrude to the second holding portion side beyond a center of the spherical bodies, and the second yokes protrude to the first holding portion side beyond centers of the spherical bodies.

5. The optical member supporting device according to claim 1, wherein at least three pairs of the first yoke and the second yoke opposed to each other are arranged.

6. The optical member supporting device according to claim 1, wherein:
   the first holding portion comprises a first magnet or a ferromagnetic body,
   the first magnet or the ferromagnetic body is opposed to a second magnet with the first yokes and the second yokes interposed therebetween.

7. An optical member driving device, comprising:
   the optical member supporting device according to claim 1; and a coil connected to the first holding portion and opposed to the second magnet.

8. A camera device, comprising the optical member supporting device according to claim 1.

9. An electronic apparatus, comprising the camera device according to claim 8.

* * * * *